Patented Dec. 16, 1930

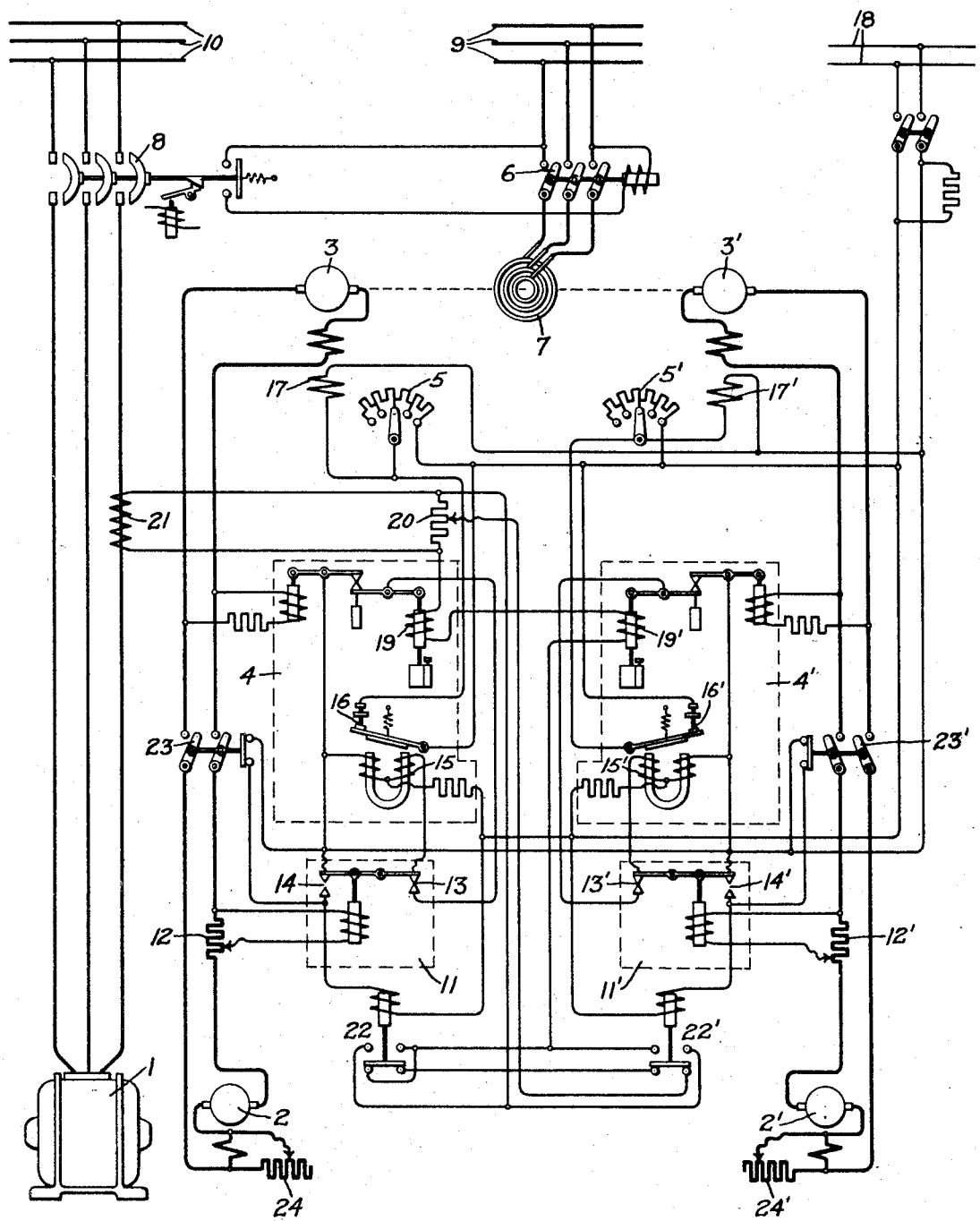

1,785,597

UNITED STATES PATENT OFFICE

KONRAD RUPPRECHT, OF BERLIN, AND RICHARD DIETZE, OF PANKOW, GERMANY, ASSIGNORS TO GENERAL ELECTRIC COMPANY, A CORPORATION OF NEW YORK

MOTOR-CONTROL SYSTEM

Application filed December 22, 1927, Serial No. 241,908, and in Germany December 31, 1926.

This invention relates to motor control systems and more particularly to control systems for electric motor driven machines, such as wood pulp grinders and the like, having separate motor driven mechanism for feeding material to the machine.

Particularly severe conditions are placed on the regulation of the wood feed in grinding machines with mechanically loaded presses. It is required that the speed of feed and the pressure of the wood should be so regulated that the consumption of current or power of the motor driving the shaft of the grinding machine remains constant. Different constructions of driving and regulating devices for this purpose are known. It has been found from experience that the regulation of the feed motors must be very sensitive and the speed of the same must be altered within wide limits with extraordinary rapidity in order to avoid fluctuations of load because between the wood supply means and their driving motors a transformation gear of about 1:30000 to 40000 is arranged. Sluggish regulation, for example, adjustment of regulating resistances by adjusting motors cannot be used for this purpose.

In practical operation the use of direct current motors in Leonard circuit arrangement with quick-acting regulation has proved to be particularly satisfactory for driving the supply means, the armature voltage of the feed motors being capable of regulation continuously and with extraordinary sensitivity practically without loss in dependence upon the load of the grinding machine motor.

Comparatively often the wood feed is obstructed by irregularities, for example, by jamming of the wood in the press-box or magazine. In this case the consumption of power of the grinding machine motor will fall rapidly whilst the regulating device tries to increase the speed of feed. Owing to this the feed motors and supply devices are seriously jeopardized. Particular difficulties arise in the case when several grinding machines are operated by a common motor and several feed mechanisms have to be regulated in dependence upon same. For this case arrangements are known in which a special speed regulator is associated with each feed motor, which regulator is controlled both by the load of the grinding machine motor as well as by the load of the other feed motors so that the feed motors should be uniformly loaded. It is true that by this means the result is obtained that, for example, on jamming of the wood in one grinding machine the pressure in the other grinding machines is so increased that the load of the grinding machine motor does not fall appreciably, yet owing to this, a correspondingly coarser ground product is produced. This makes the further course of the manufacture more difficult and affects the quality of the paper.

In contradistinction to the above the idea of the present invention resides in the provision of a protective device for the individual feeding devices against overload by current control devices, which simultaneously act on the feed regulation in such a way that the uniformity of the feed in the other grinding machines is not affected by trouble in one grinding machine.

The attached diagrammatic drawing shows, for example, the carrying out of the idea of the invention for the regulation of two grinding machines operated by a common motor 1. The two feed motors 2 and 2', represented as direct current main circuit motors, are supplied respectively by Leonard dynamos 3 and 3', whose armature voltages are regulated in dependence upon the load of the grinding machine motor 1 practically without loss by means of known quick-acting regulators 4 and 4' and regulating resistances 5 and 5'. The main switch 6 of the driving motor 7 for the Leonard dynamos 3 and 3' is so interlocked with the main switch 8 of the motor 1 that on tripping of the latter the feed driving devices are positively disconnected. It will be understood that the switches 6 and 8 control the connection of the motors 7 and 1 with suitable electrical supply mains 9 and 10, respectively, which may lead and preferably do lead to a common supply source. The loading of the feed motors 2 and 2' is controlled by the current control devices 11 and 11', which work appropriately according to the vibration principle, like the quick-acting regulators. Their current coils are supplied through adjustable resistances 12 and 12′ with a value of current, which is proportional to the load of the feed motors 2 and 2′. The contact levers of the current control devices remain in their normal position until the current exceeds a predetermined precisely adjustable value. If, for example, the load of the feed motor 2 exceeds a predetermined value the current control device 11 responds. At the same time the contact 13 is broken, and with a still greater value of current the contact 14 is closed. The contact 13 breaks the control current of the relay coil 15 of the quick-acting regulator 4, whereby the pair of contacts 16 is opened. The voltage of the dynamo 3 is thereby reduced to such an extent that the feed motor 2 can still run slowly. If the obstruction is not soon removed the value of current of the feed motor will increase still further. By means of the contact 14 of the current control device in case of necessity the field 17 of the dynamo can then be short circuited or a special relay inserted, which connects an additional resistance in the exciting circuit of the dynamo, which diminishes the excitation and armature voltage to zero. In the drawing this relay and the additional resistance is not shown. In this manner an effective protective device against overload of the feeding members operating free from objection is provided. The feed motor consequently need not be disconnected on overload and automatically resumes as soon as the obstruction is removed. As shown, the fields 17 and 17′ of the generators 3 and 3′ are energized from a suitable supply source 18, the resistances 5 and 5′ being included in circuit therewith, respectively.

In order to avoid affecting the feed of the other grinding machines during jamming in one of the grinding machines, the following protective arrangement is provided. The quick-acting regulator 4 would try to prevent the falling of the load of the grinding machine motor 1 by increasing the voltage of the dynamo 3. Its current coil 19 must, therefore, be further supplied with approximately the normal value of current, when the current control device 11 responds, even if only one of the grinding machines is loaded. For this purpose the protective resistance 20 is connected in parallel to the secondary winding of the current transformer 21. When the current control devices 11 and 11′ are in the normal position, only about half of the resistance 20 is connected in parallel, so that the current coil 19 is loaded with about half of the secondary current of the current transformer 21. If, however, with greater overloading one of the current control devices 11 or 11′ responds, then by means of auxiliary contacts 14 the associated reversing relay 22 or 22′ is inserted and by this means a greater resistance is connected in parallel to the current transformer 21, so that the coils 19 and 19′ of the quick-acting regulators 4 and 4′ are now approximately normally loaded even in the case of diminished load of the motor 1.

The auxiliary contacts arranged on the switches 23 and 23′ have also the same purpose.

The regulating resistances 24 and 24′ serve for balancing the speed of the feed motors according to the differences in diameter of the grinding stones, etc., for example, when the one stone has been newly inserted and the other is considerably worn away.

What we claim as new and desire to secure by Letters Patent of the United States, is,—

1. An electric motor control system comprising an electric driving motor, a pair of electric feed motors for applying independent loads to said driving motor, separate generators for supplying power to said feed motors, means responsive to the load on said driving motor for regulating the voltage of said generators so as to maintain a predetermined load on said driving motor, and means responsive to the load on each of said feed motors for regulating the voltage of its respective generator.

2. The combination with a plurality of grinders having a common electric driving motor, of independently variable electric feed motors for loading the respective grinders, an electric generators for supplying power to each of said feed motors, regulating means for each generator responsive to the load on said driving motor for regulating the voltages of said generators so as to maintain a predetermined load on said driving motor, and means responsive to the load on each of said feed motors for varying the setting of the regulating means for its respective generator.

3. The combination with a plurality of grinders, a common driving motor therefor, a separate feed mechanism for each of said grinders, a separate electric motor for operating each of said feed mechanisms, a separate electric generator provided with a field winding for supplying power to each of said feed motors, means responsive to the load on said driving motor for regulating the field windings of said generators so as to maintain a predetermined load on said driving motor, and means responsive to the current supplied to each of said feed motors for regulating the field winding of its respective generator.

4. The combination with a plurality of grinders, a common driving motor therefor, a separate feed mechanism for each of said grinders, a separate electric motor for operating each of said feed mechanisms, a separate electric generator provided with a field winding for supplying power to each of said feed motors, means responsive to the load on said driving motor for regulating the field windings of said generators so as to maintain a predetermined load on said driving motor, means responsive to the current supplied to each of said feed motors for regulating the field winding of its respective generator, and means responsive to the current supplied to each of said feed motors for varying the setting of said first regulating means.

5. The combination with a plurality of grinders, a common driving motor therefor, a separate feed mechanism for each of said grinders, a separate electric motor for operating each of said feed mechanisms, a separate electric generator provided with a field winding for supplying power to each of said feed motors, means responsive to the load on said driving motor for regulating the field windings of said generators so as to maintain a predetermined load on said driving motor, means responsive to the current supplied to each of said feed motors for regulating the field winding of its respective generator, and means responsive to the current supplied to each of said feed motors for changing the current setting of said first regulating means upon failure of the feed mechanism driven by said motor so that overloading of the other motor is prevented.

In witness whereof, we have hereunto set our hands this 8th day of December, 1927.

KONRAD RUPPRECHT.
RICHARD DIETZE.